Aug. 25, 1959  C. A. CARLSON ET AL  2,900,775
BOTTLE HANDLING MACHINE
Filed Jan. 21, 1954  4 Sheets-Sheet 3

INVENTOR.
CARL A. CARLSON,
DENNIS L. POMMER AND
LYNDON H. REITEN
Caswell & Lagaard
ATTORNEYS

United States Patent Office 2,900,775
Patented Aug. 25, 1959

2,900,775

BOTTLE HANDLING MACHINE

Carl A. Carlson, Dennis L. Pommer, and Lyndon H. Reiten, Minneapolis, Minn., assignors to General Tool & Engineering Inc., Minneapolis, Minn., a corporation of Minnesota Application January 21, 1954, Serial No. 405,315

12 Claims. (Cl. 53—160)

The herein disclosed invention relates to bottle handling machines and has for an object to provide a machine by means of which bottles may be deposited in cases used in carrying the same.

Another object of the invention resides in providing a first conveyor carrying empty cases having compartments for the reception of the bottles and a second conveyor extending transversely of the first conveyor and carrying bottles with which the compartments of the cases are to be filled.

A still further object of the invention resides in providing bottle guide means between the discharge end of the second conveyor and the first conveyor and including a chute for directing the bottles into the compartments of the cases.

Another object of the invention resides in providing transferring means for transferring the bottles from the second conveyor to the chute.

An object of the invention resides in arranging the first conveyor in inclined position and the second conveyor transversely thereof in a horizontal position above the first conveyor.

A still further object of the invention resides in arranging the chute in inclined position and substantially at right angles to the first conveyor.

Another object of the invention resides in providing the transferring means with a tilting device by means of which the bottles are tilted to the angle of the chute as the same are discharged into the chute.

A still further object of the invention resides in providing the chute with a bottom along which the bottles slide and in further providing an extension to said bottom adapted to be projected into the cases to direct the bottles into the proper compartments.

A feature of the invention resides in providing actuating means for the extension whereby the extension is retracted after the last compartment of a case is filled and is subsequently inserted into the first compartment of the following case prior to the discharge of bottles therein.

An object of the invention resides in providing spacing means for spacing the bottles laterally of the first conveyor whereby a plurality of bottles may be simultaneously discharged into each section of a case having several compartments to each section and clearing the partitions between the compartments.

Another object of the invention resides in providing compensating means for compensating for the increased distance between the last compartment of a certain case and the first compartment of the next case following as compared to the distance between compartments in the cases.

Other objects of the invention reside in the novel combination and arrangement of parts and in the details of construction hereinafter illustrated and/or described.

The construction shown in the drawings comprises an upwardly inclined carrier on which empty bottle cases are carried. This conveyor is fed by means of a feed conveyor traveling at a greater rate of speed than the inclined conveyor. Extending transversely over and above the inclined conveyor is a conveyor for carrying bottles and which supports the bottles in upright position. Guide means extending between the discharge end of the bottle conveyor and the inclined conveyor includes a chute into which the bottles are directed and which deposit the bottles in the compartments of the cases. The chute has a movable bottom including a bottom extension which projects into the cases and prevents the bottles from being deposited into the wrong compartments. This extension is retractable so that when the last compartment of the case has been filled the extension is withdrawn to clear the end walls of the case and directed back into the first compartment of the following case. The bottles are transferred by transfer means from the bottle conveyor to the guide means. This is accomplished by means of a pusher which forces the bottles against a tilting bar and discharges the bottles into the chute. In order to compensate for the increased distance between the first and last compartments of adjoining cases compensating means are provided. This means consists in providing hinged sections to the bottom of the chute which are adapted to move in the direction of movement of the inclined conveyor. The inclined conveyor travels at a rate such that when the transferring means has transferred a number of bottles into a case sufficient to fill the case, the conveyor will have traveled a distance equal to the length of a case plus the distance between cases. The said bottom is simultaneously caused to travel in the same direction as the inclined conveyor so that the said bottom is in proper position to discharge into each of the sets of sections when the transferring means operates. The compensating means further operates to release the chute bottom when the last compartment has been filled bringing the chute into a position to discharge into the first compartment of the following case.

Throughout the specification and in the claims, the machine has been referred to as a bottle handling machine, and the drawings illustrate a machine used for such purpose. It can, however, readily be comprehended that the machine may also be used for handling cans or other containers, or in fact any article to be deposited in a case, and the notation "bottle" is to be interpreted as including all such forms of articles.

For the purpose of illustration, the machine has been shown as handling milk bottles such as indicated at 154 in the drawings. These bottles are adapted to be received in cases 155 which have end walls 156 and 157. The said cases further have side walls 158 and a bottom not shown. Within the cases are longitudinal partitions 159 and transverse partitions 161, 162 and 163 which divide the case into compartments 164 adapted to receive the milk bottles 154.

The machine is carried by a framework indicated in its entirety by the reference character A. This framework is constructed of tubing welded together to form the various components of the same. Said framework has a lower frame 10 which consists of two longitudinal frame members 11 and 12. The frame members 11 and 12 are connected together at their ends by means of cross frame members 20 and intermediate their ends by means of cross frame members 13. The lower frame 10 further includes an extension 33 which comprises two transversely extending frame members 34 and 35 which are connected together at their outer ends by means of a longitudinal frame member 36. The frame members 34 and 35 at their other ends are welded to the frame member 12 of frame 10 and lie in continuation of the cross frame members 13 of said frame.

The framework A further comprises two vertical side frames 14 and 15 which are identical in construction. Only the side frame 14 will be described in detail. This side frame comprises two end uprights 16 and 17 which issue upwardly from the ends of the frame members 20 and two intermediate frame members 18. The upright 17 is formed with a bend 19 which forms in said frame a slightly inclined upper frame member 21. This frame member has a bend 22 in it which forms another frame member 23 extending at a greater slope than the frame member 21. Upright 16 has a bend 24 in it which forms an upwardly inclined frame member 25. This frame member and the frame member 23 approach one another and are united through a loop 30 lying in continuation of both of them. The frame member 18 is welded to the frame member 21 and has a portion 26 extending upwardly above the same. This portion has a sharp bend 27 which provides a horizontal frame member 28. A bend 29 in the frame member 28 forms a downwardly inclining frame member 31 which is welded to the frame member 23. A brace 32 between the frame members 25 and 23 lies in continuation of the frame member 31 and ties the parts together.

Superimposing the extension 33 is an upper horizontal frame 40 which consists of a longitudinal frame member 43 which is bent as indicated at 44 to form two transverse frame members 45 and 46. The ends of these frame members are welded to the frame member 28 of side frame 15. Extending upwardly from the transverse frame member 35 near its end is an upright 37 and intermediate the ends of the transverse frame member 34 is another upright 38, which uprights are welded to the frame members 35 and 34. The upright 37 has a bend 41 at its end which provides a transverse frame member 42 lying directly above the frame member 35 of frame 33 and at the same elevation as the frame 40. This frame member is welded to the longitudinal frame member 43 of frame 40. The upright 38 is formed with an angular portion 70 which is welded to the frame member 46 of frame 40.

Mounted upon the side frame members 14 and 15 and extending along the frame members 23 thereof is a conveyor B which is employed for transporting cases, such as indicated at 155, past a given station of the machine designated by the reference numeral 50. This conveyor consists of two shafts 51 and 52 rotatably mounted in bearings 53 and 54. The bearings 53 are attached to plates 55 welded to the frame members 23 and 25 while the bearings 54 are attached to plates 56 welded to the frame members 21 at the bends 22 and to the frame members 11 and 12. Mounted on the shafts 51 and 52 are sprocket wheels 57 and mounted on the shaft 52 are sprocket wheels 58. These wheels carry two chains 59, which have lugs 61 extending outwardly therefrom and which are spaced along said chains a distance slightly greater than the lengths of the cases 155 to permit of the said lugs entering in between the cases and elevating the same. The upper runs 63 of chains 59 ride upon a plate 64 which extends between the plates 55 and 56. Plate 64 has flanges 65 turned upwardly therefrom along its lateral edges and the said plate and flanges are welded to the plates 55 and 56. By means of this construction a support is provided for the run 63 whereby the weight of the cases 155 is carried, without causing undue strain on the chains. The conveyor B is disposed at a considerable angle for a purpose to be presently described and discharges the cases on to another conveyor 62 and which removes the filled cases from the machine. This conveyor may be driven by any suitable means not shown in the drawings.

Operating in conjunction with the conveyor B a feed conveyor C is employed. This conveyor utilizes the shaft 52 and includes another shaft 66. Shaft 66 is journaled in bearings 67 which are mounted on plates 68 welded to each of the frame members 21 of the side frames 14 and 15 and to the frame members 11 and 12 of the frame 10. On the shaft 52 are mounted sprockets 69 and on the shaft 66 are mounted sprockets 71. Chains 72 pass over these sprockets and are arranged so that the upper run 73 thereof is slightly inclined in an upward direction. The runs 73 ride on a plate 74 similar to the plate 64 and which has flanges 75 at its lateral edges turned upwardly therefrom. This plate and flanges are welded to the plates 56 and 68 and to the uprights 18. The cases 155 are deposited upon the runs 73 of chains 72, and the sprocket 69 is constructed considerably larger than the sprocket 58 so that said chains travel faster than the chains 59. In this manner the chains slip relative to the cases when the cases on the conveyor C reach the cases on the conveyor B. In this manner, the cases on the conveyor B are always spaced properly, and as long as the cases are closely loaded on the conveyor C no gaps occur on conveyor B.

Figures 2, 5:
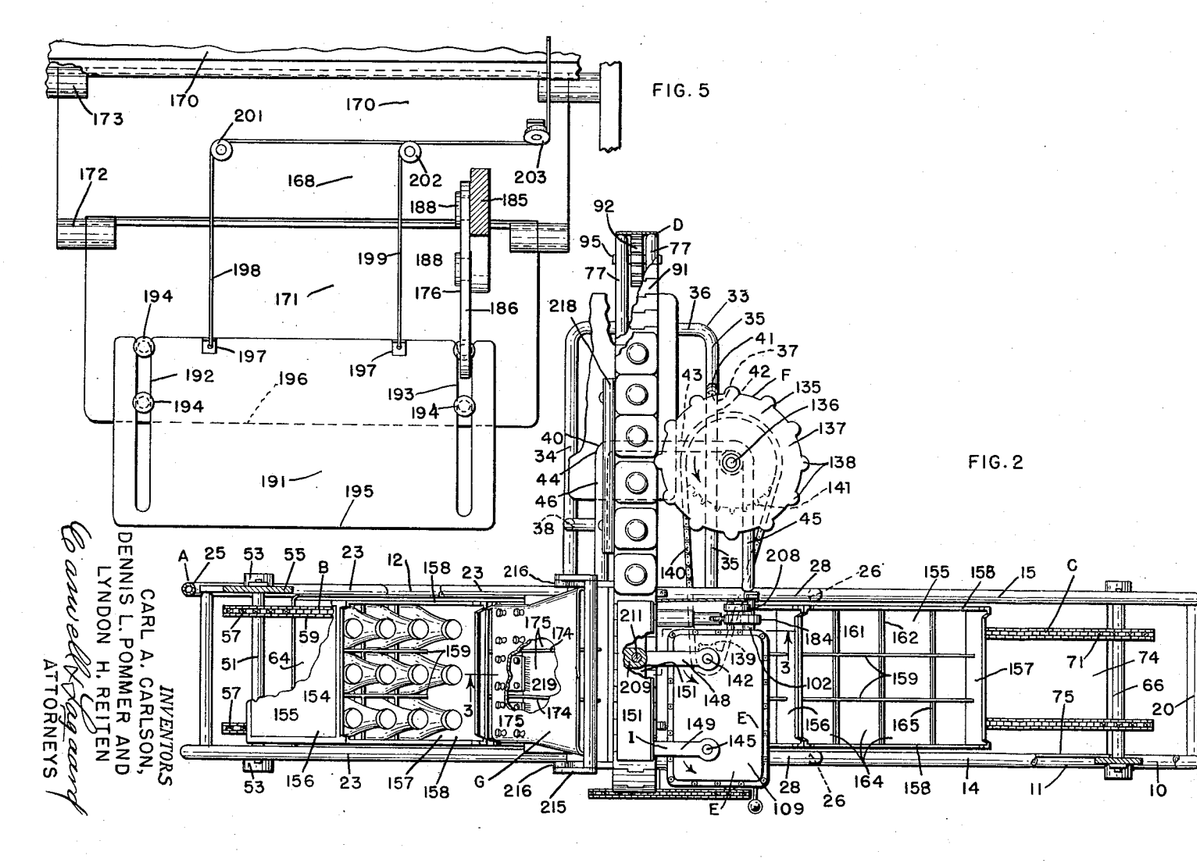
Fig. 2 is a plan view of the structure shown in Fig. 1.
Fig. 5 is an inverted view of the delivery chute taken on line 5—5 of Fig. 3 and drawn to a greater scale.
Figure 6:
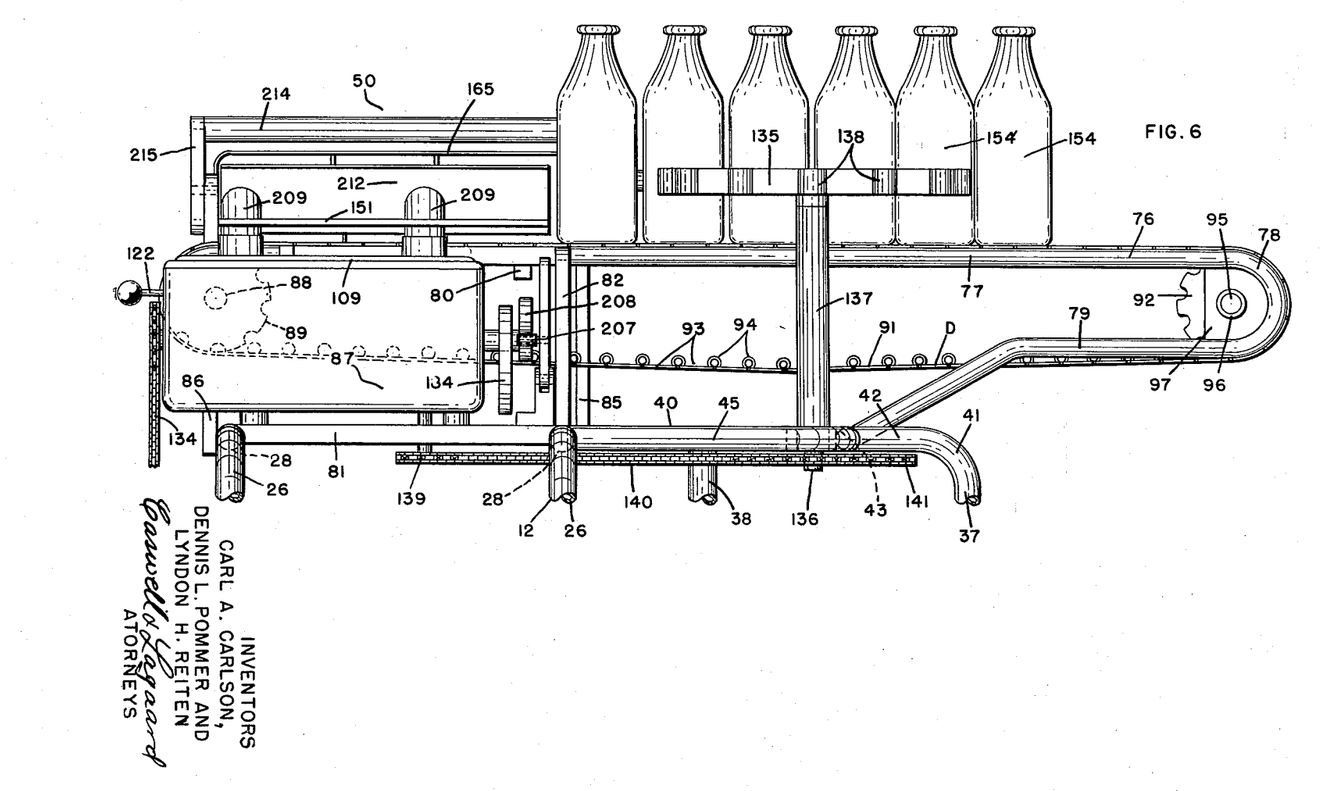
Fig. 6 is an end elevational view of a portion of the machine viewed from the right as shown in Fig. 2.

For the purpose of delivering the bottles to station 50, a bottle conveyor D is employed. This conveyor is best shown in Figs. 2 and 6 and is supported on a frame indicated in its entirety by the reference numeral 76. The frame 76 consists of two horizontal tubular frame members 77, best shown in Fig. 2, which are disposed above the upper frame 40. These frame members are formed with loops 78 which terminate in lower frame members 79. The latter frame members are welded to the cross frame member 43 of the frame 40. Extending across the two frame members 28 of the side frames 14 and 15 is a plate 81 (Fig. 3) which lies flush with the upper surface thereof. This plate has extending upwardly therefrom two arms 82 which have welded to the upper ends of the same a rail 83. Another rail 84 parallel with and lying in the same plane as the rail 83 is secured thereto by means of cross bars 80. The two rails 83 and 84 are welded to the ends of the tubular frame members 77 nearest conveyor B and lie in continuation of said rails. The rail 84 is further supported by means of two brackets 216 issuing upwardly from the frame members 28 of the side frames 14 and 15. These brackets serve a purpose to be presently described.

The conveyor D is constructed as follows: Mounted on and attached to the plate 81 is a transmission E which includes a housing 87. This transmission serves to operate the various parts of the invention and will be subsequently more fully described. The transmission E has a shaft 88 which extends outwardly from the housing 87 and on it is mounted a sprocket wheel 89. A chain 91 passes over this sprocket wheel and over another sprocket wheel 92 located in proximity to the loops 78 in frame 76. The chain 91 consists of a number of plates 93 hinged together through hinge joints 94 which extend inwardly of the plates and are adapted to register with the teeth of the sprocket wheels 89 and 92 and to be driven thereby. The hinge joints terminate short of the ends of the plates and the free ends of said plates ride upon the frame members 77 and the rails 83 and 84. The sprocket wheel 92 is mounted on a shaft 95 which is journaled in bearings 96 attached to plates 97. These plates are in turn welded to the loops 78 of frame 76. By means of this construction bottles deposited upon the chain 91 are progressed along the conveyor D and to the station 50.

Figure 4:
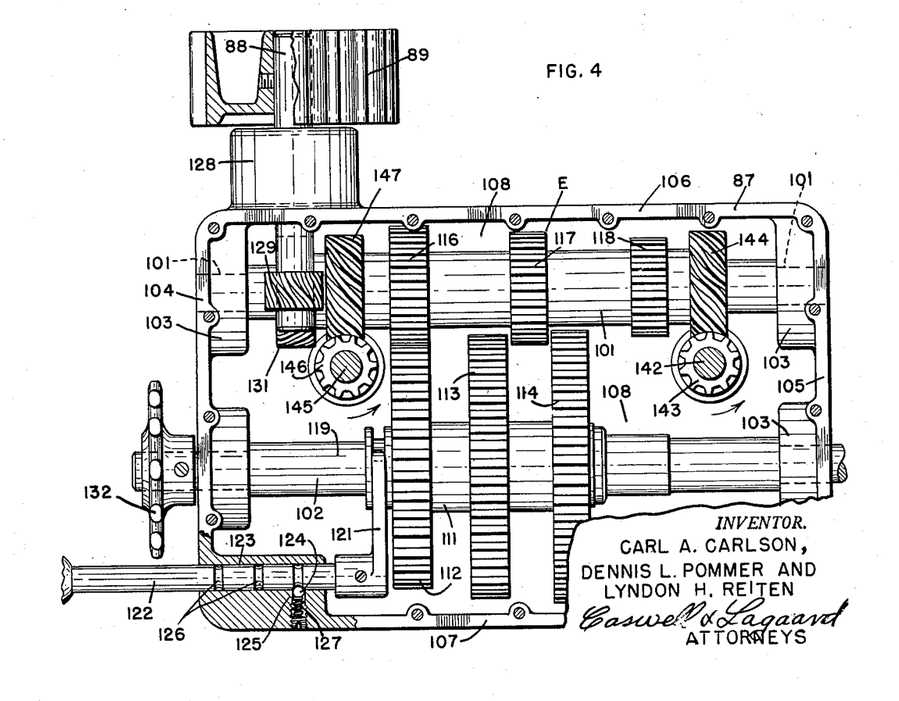
Fig. 4 is a plan view of the power transmission with the cover removed.

The transmission E within the housing 87 is best shown in Fig. 4 where the cover for the said transmission has been removed. Housing 87 consists of end walls 104 and 105 and side walls 106 and 107 connected thereto. A bottom 108 connects the walls together and a removable cover 109 closes the top of the housing. The transmission consists of two shafts 101 and 102 which extend along said housing in a direction transverse to the frames 14 and 15 and the conveyors mounted thereon. These shafts are journaled in bearings 103 attached to the end walls 104 and 105 of the housing. The shaft 102 serves as a drive shaft and has slidably mounted on it a gear unit 111 which consists of three gears 112, 113 and 114 of different sizes and all rigidly connected together. These gears are adapted to mesh respectively with gears 116, 117 and 118 secured to shaft 101 when the unit 111 is slid along the shaft 102. For sliding the gear unit 111, a grooved collar 119 is employed which is fast to said gear unit. A fork 121 straddling this collar, and received in the groove thereof, is mounted on a shift rod 122 extending through a guide 123 in housing 87 and projecting through the wall 104 thereof. A ball 124 mounted in a bore 125 disposed transversely of the guide 123 is adapted to engage any of a number of grooves 126 formed in the rod 122. A spring 127 urges the ball 124 into engagement with said grooves. The shaft 88, previously referred to, is journaled in a bearing 128 formed on the wall 106 of housing 87. This shaft has mounted on the end of it a spiral gear 129 which meshes with a similar gear 131 on the shaft 101. The shaft 88 is restrained from axial movement by suitable means associated with the bearing 128 and which, forming no particular feature of the invention, has not been shown in detail in the drawings.

The shaft 102 of the transmission E extends outwardly beyond the wall 104 where it has attached to it a sprocket wheel 132. A similar sprocket wheel 133 is mounted on the shaft 52. A chain 134 passes over the sprocket wheels 132 and 133 and serves to operate the transmission E from the shaft 52. Power may be applied to the machine through a suitable motor not shown and which drives through suitable belting or other transmission means the shaft 52.

In order to maintain the bottles 154 properly spaced to clear the partitions 159 in the cases 155, a spacing means F is employed. This spacing means comprises a toothed star wheel 135 which is mounted above the frame 76. This toothed wheel is attached to a vertical shaft 136 which is journaled in a tubular bearing 137. Bearing 137 is situated in the crotch formed by the bend 44 between frame members 43 and 45 of frame 40 and is welded thereto. The toothed wheel 135 has teeth 138 which are adapted to engage in between the bottles 154 and to space the same a certain distance apart. The bottles are fed up to the wheel 135 by hand or by means of another conveyor, not shown, and can readily slide along the chain 91. Where another conveyor is used, the conveyor travels at a higher rate of speed so that the bottles are always in contact and urged up against the toothed wheel 135. This wheel, hence, holds the oncoming bottles back and spaces the bottles as they reach the end of the conveyor. The lower end of shaft 136 projects below the bearing 137 and has mounted on it a sprocket wheel 141. Extending downwardly from the transmission E is a shaft 142 which is mounted for rotation in a suitable bearing attached to the bottom 108 of housing 87. This shaft has mounted on it, within said housing, a spiral gear 143 which meshes with another spiral gear 144 mounted on shaft 101. Attached to shaft 142 below housing 87 is a sprocket 139. A chain 140 passes about the sprockets 139 and 141 and serves to drive said toothed wheel from transmission E. Operating in conjunction with the toothed wheel 135 is a guide 218 which is constructed from tubing and which is attached to the frame member 46. This guide extends along the conveyor D and prevents the toothed wheel 135 from pushing the bottles off from the conveyor. The said guide together with the teeth 138 on the wheel 135 cause the bottles to separate.

Figure 1:
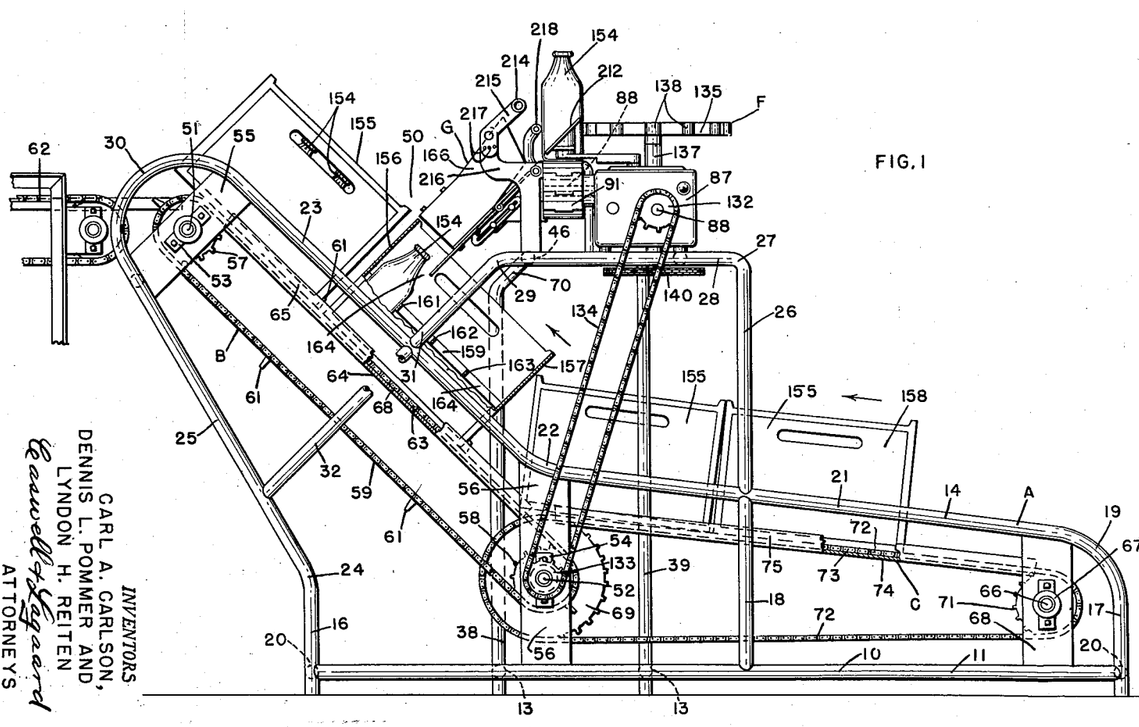
Fig. 1 is a side elevational view of a bottle handling machine illustrating an embodiment of the invention.
Figure 3:
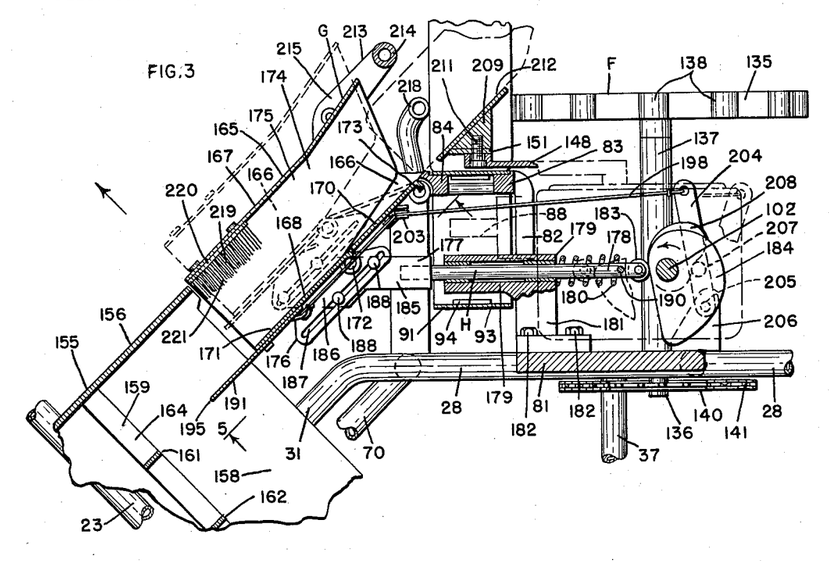
Fig. 3 is an elevational sectional view taken on line 3—3 of Fig. 2 and drawn to a greater scale.

The milk bottles ride on the conveyor D and are directed from said conveyor to the compartments 164 in the cases 155 by guide means G most clearly shown in Figs. 1, 2 and 3. The said guide means includes a chute 165 which consists of side walls 166 and a top 167. This chute has a bottom 168 formed with an upper section 170 and a lower section 171. The two sections are hingedly connected together through a hinge 172 and the upper section 170 is connected by means of a hinge 173 to the rail 84. The side walls 166 of the chute 165 are welded to the lower section 171 so that the entire chute travels with the said section. Within the chute are disposed two partitions 174 which divide the chute into three passageways 175. These partitions are arranged so that the same register with the partitions 159 of the cases 155 and so that the passageways 175 discharge into the compartments 164 of the cases.

Movement of the chute 165 from its full line position to that shown in dotted lines in Fig. 3 is accomplished by an actuating means 177 best shown in Fig. 3. This actuating means consists of a push rod 178 which is slidably mounted in a guide 179 attached to a bracket 181. Bracket 181 is secured to the plate 81 by means of bolts 182. The push rod 178 has a cam follower 183 in the form of a roller pivoted to the end of the same and which is adapted to be engaged by a cam 184, which in turn is attached to the end of the shaft 102 protruding outwardly beyond the wall 105 of the transmission housing 87. The other end of the rod 178 has attached to it a head 185 which is connected to the section 171 of the bottom 168 of chute 165 and which serves to move said chute from the position shown in full lines in Fig. 3 to that shown in dotted lines.

The lower bottom section 171 of the bottom 68 of chute 175 is movable through the hinges 172 and 173 and is maintained at all times parallel to the end walls 156 and 157 of the cases 155 by means of a parallel motion linkage 176. This parallel motion linkage includes a plate 186 which extends downwardly from the bottom section 171 and which is welded thereto. This plate has a slot 187 in the same and which is parallel to the bottom section 171. Extending through said slot are two headed studs 188 which are attached to the head 185 on the push rod 178. These studs travel along the slot 187 and maintain the bottom section 171 parallel to the end walls 156 or 157 of the cases 155 regardless of the movement thereof. The studs 188 in cooperation with the plate 186 also hold the rod 178 from rotation and maintain the cam follower 183 in proper position with reference to cam 184. A spring 180 encircling the rod 178 bears against the bracket 181 and a pin 190 secured to said rod and maintains cam follower 183 in engagement with cam 184.

As will be noted in Fig. 1, the lugs 61 on the chains 59 engage the cases and progress the same upwardly along conveyor B. These lugs of necessity provide spaces between the cases. The distance between the last compartment in any one case and the first compartment in the following case is hence greater than the distance between the compartment in the cases. To cause the guide means G to properly guide the bottles into the respective compartments in the cases, compensating means H are employed. This compensating means utilizes the hinge construction of the bottom 168 of the chute 165, the push rod 178, and the cam 184. For the desired purpose, the conveyor B is run at a speed such that the required number of bottles are discharged into the guide means G when the conveyor has traveled a distance equal to the length of one of the cases 155 plus the length of space between cases, which is the distance from one lug 61 to the next. This means that the conveyor B is traveling faster than it would have traveled had there been no space between the cases. The cam 184 is designed so that the bottom 171 of chute 165 moves with the cases 155 whereby the said bottom is in substantial register with each of the partitions 161, 162 and 163 at the time the bottles are discharged into the compartments 164 bounded thereby. The cam 184 is so fashioned that when the guide has filled the last compartment the chute 165 will have dropped back to a normal position in which it is ready to feed the first compartment of the following case.

To assist in guiding the bottles into the compartments 164 of case 155, an extension 191 of the bottom section 171 of chute 165 is provided which underlies the same. This extension is best shown in Fig. 5. The extension 191 is constructed of sheet metal and is formed with two slots 192 and 193 which are parallel to the walls 166 of chute 165. Headed studs 194 pass through these slots and are secured to the lower section 171 of the bottom 168 of chute 165. The slot 193 receives the plate 186 forming part of the parallel motion linkage 176. By means of the said studs and slide, the extension is guided for sliding movement from an extended position, as shown in Fig. 3, to a retracted position, in which the lower edge 195 thereof substantially coincides with the lower edge 196 of the bottom section 171.

For moving the extension 191 the following construction is employed. Attached to lugs 197 mounted at the upper edge of the extension 191 are two cables 198 and 199. The cable 198 passes over a pulley 201 while the cable 199 passes over a pulley 202. Both of the cables pass over pulleys 203 and are connected to the end of a lever 204 shown in Fig. 3. This lever is pivoted at 205 to a bracket 206 which in turn is secured to the plate 81. The lever 204 carries a cam follower 207 which engages a heart-shaped cam 208. This cam is mounted upon the shaft 102 and is disposed adjacent the cam 184. The cam 208 is so designed that the extension 191 drops into place adjacent the partition 161 of the case when the first set of bottles are inserted into the case and is retracted from the case when the last set of bottles have been deposited in the same.

The bottles are transferred from the conveyor D to the conveyor B by transferring means indicated by the reference character I. This transferring means utilizes the shaft 142 and another shaft 145 mounted in suitable bearings carried by the housing 87. The shaft 145 is parallel to the shaft 142 and has mounted on it a spiral gear 146 meshing with another spiral gear 147 fast on the shaft 101. The gear ratio between the gears 147 and 146 and between the gears 144 and 143 are the same so that the shafts 142 and 145 travel at the same rate of speed. These two shafts extend upwardly through the cover 109 and above the case 87 and have attached to the ends thereof two arms 148 and 149, best shown in Fig. 2. Overlying the outer ends of said arms is a plate 151 which has bosses 209 extending upwardly therefrom. Bolts 211 extend through the outer ends of the arms 148 and 149 and are screwed into said bosses. Extending across the bosses 209 is a pusher 212 in the form of a plate and which sets at substantially the same angle with reference to the horizontal as the bottom 168 of chute 165. The pusher 212, when the arms 148 and 149 are at their outermost position, lies in continuation of the bottom 168 of chute 165 as shown in Fig. 3. When the said arms rotate through an angle of 180 degrees said pusher is moved rearwardly and out of the way of the conveyor D. It will hence be readily comprehended that the bottles are pushed off from the conveyor D and into the chute 165. The pusher 212 also forms a part of a tilting device indicated by the reference numeral 213. This tilting device further includes a tilting rod 214 which is arranged at an elevation above the conveyor D and extends along said conveyor for a distance somewhat greater than the length of the chute 165. The said tilting rod is also disposed a distance above the upper run of the conveyor D greater than the transverse dimension of the milk bottles on said conveyor. The tilting rod 214 is mounted on arms 215 which are pivoted on the brackets 216, best shown in Fig. 1. These arms have holes 217 in the same and through which pins may be inserted into registering holes in the said bracket, not illustrated, whereby the position of the tilting rod 214 may be adjusted relative to conveyor D. The brackets 216 are attached to the rail 84 and to the longitudinal frame member 46 of the frame. As the pusher 212 operates it forces the three milk bottles opposite the chute 165 against the rod 214. This causes the milk bottles to tilt as shown in dotted lines in Fig. 3 and the bottles slide off from the said pusher and along the bottom 168 of chute 165 and into the compartments 164 in the cases 155.

To prevent injury to the bottles in their passage into the cases, a retarding device 219 is employed for each passageway 175 in the chute 165 and which is carried by the top 167 of chute 165. This retarding device consists of a back 220 which is secured to the inner surface of top 167 and which has bristles 221 issuing therefrom and extending into said passageway. As the bottles pass through said passageway, the same strike the bristles 211 and the rate of movement thereof is reduced sufficiently to prevent injury to the bottles as they strike the bottom of the case.

The method of operation of the invention is obvious. The bottles are placed on the conveyor D in close proximity to one another. The bottles may be placed there by hand or may be discharged on said conveyor from another conveyor. In either case the bottles may be placed close together so that accurate manual spacing is unnecessary. As they pass the spacing means F, the toothed wheel 135 spreads the bottles apart by holding back the approaching bottles on the conveyor D until the passing ones are the right distance apart, and in such relation are delivered to station 50. At the same time cases 155 are placed upon the conveyor C. The cases reaching the end of said conveyor are picked up by the lugs 61 of conveyor B and moved past station 50. The conveyor C running at a higher rate of speed than conveyor B causes the cases to crowd up to the cases on conveyor B so that the cases successively pass station 50 without skips. Transferring means I is then actuated and the pusher 212 directs the bottles against the tilting rod 214 and tilts and discharges them into the passageways 175 of the chute 165 of guide means G. The bottles slide through the passageways 175 and into the compartments 164 of the cases 155. By means of the cam 184 of the compensating means H, the bottom 168 of said chute is advanced with the movement of the cases 155 on conveyor B so that when the transferring means I is ready to discharge, the bottom 168 is in alignment with one of the partitions 162, 163 or the end wall 157 of the cases. After the chute discharges into the last section of compartments of a case, the cam 184 quickly returns the chute 165 to its retracted position, whereby it comes into register with the partition 161 of the following case. At the same time the chute 165 is retracted, the bottom extension 191 is raised to clear the end walls 156 and again lowered by gravity so that it occupies its proper position when the bottles are being discharged into the first section of compartments of the cases. The filled cases are then discharged upon conveyor 62 by means of which they are removed from the machine.

The advantages of the invention are manifest. The bottles can be accurately and carefully placed in the cases. The machine operates automatically so that much manual labor is saved. Breakage of the bottles it almost entirely prevented. The machine is positive in action and foolproof in construction.

Changes in the specific form of the invention as herein described, may be made within the scope of what is claimed without departing from the spirit of the invention.

Having described the invention, what is claimed as new and desired to be protected by Letters Patent is:

1. In combination, a conveyor carrying bottle cases having bottle receiving compartments successively passing a given station, a second conveyor carrying bottles and delivering them at said station, a chute for directing the bottles from said second conveyor to the compartments in said cases, means at the discharge end of said second conveyor engaging the bottles and transferring them from the second conveyor to said chute, at a predetermined constant rate, said first conveyor moving at a constant rate of speed such that when a number of bottles sufficient to fill a case have been discharged into the chute the conveyor will have traveled a distance equal to the length of a case plus the distance between cases, guide means for guiding said chute for movement in the direction of movement of said case, said chute being normally positioned to register with the first compartment of a case, compensating means for advancing said chute to cause the chute to register with each of the compartments of said cases at the times of delivery of the bottles to the respective compartments, said compensating means operating to return said chute upon filling of the last compartment in a case from its advanced position to its normal position to position the chute for delivery to the first compartment of a following case.

2. In combination, a continuously moving conveyor carrying bottle cases having longitudinal and transverse partitions therein forming sets of compartments successively progressed past a given station, guide means at said station simultaneously guiding a suitable number of bottles to fill the compartments of a set of compartments, a second conveying carrying bottles and delivering them at said station at a rate of speed faster than required to fill the compartments in said cases, spacing means disposed adjacent said second carrier and including a toothed wheel disposed on one side of the row of bottles and movable in the same direction as said second carrier, the teeth of said wheel converging in an outward direction and entering in between the bottles in the row and holding back the approaching bottles on the second conveyor and spacing the bottles passing said wheel a distance sufficient to clear said partitions, a guide extending along the row of bottles on the opposite side thereof, and maintaining the bottles in alignment in a single row while being separated and transferring means for transferring the bottles from said second conveyor to said guide means.

3. In combination, an inclined conveyor carrying bottle cases provided with end walls and having partitions with their upper edges below the upper edges of the end walls to provide bottle receiving compartments, said conveyor progressing said cases with the compartments successively passing a given station, a second conveyor carrying bottles and delivering them at said station, a chute arranged transversely of said first conveyor and receiving bottles from said second conveyor, said chute being disposed substantially at right angles to said first conveyor, said chute clearing the cases as they pass said station, an extension for said chute, guide means for guiding said extension for movement in the direction of extent of said chute into and out of said cases and actuating means operated in synchronism with said first conveyor and operating said extension to direct said extension into a case when the leading end wall of the case reaches said station to maintain said extension in said case while the compartments pass said chute and to retract said extension when the trailing end wall of the case leaves said station and transferring means for transferring the bottles from said second conveyor to said chute.

4. In combination, an inclined conveyor carrying bottle cases having bottle receiving compartments and progressing said cases with the compartments successively passing a given station, a second conveyor carrying bottles and delivering them at said station, a chute arranged transversely of said first conveyor and receiving bottles from said second conveyor, said chute being disposed substantially at right angles to said first conveyor, said chute clearing the cases as they pass said station, an extension for said chute, guide means for guiding said extension for movement into and out of said cases and actuating means including a cam driven in synchronism with said first conveyor, a cam follower cooperating therewith, a cable connected to said extension and moved by said cam follower to retract said extension from within said case when the trailing end wall of the case leaves said station and to free said extension for movement into the case when the leading end wall of the case reaches said station and transferring means for transferring the bottles from said second conveyor to said chute.

5. In combination, an inclined conveyor carrying bottle cases having bottle receiving compartments arranged in successive order, said conveyor progressing said cases one after the other to cause the compartments to successively pass a certain station, a second substantially horizontal conveyor carrying bottles in upright position, said second conveyor being arranged transversely of said first conveyor and above the same, an inclined chute extending laterally of said second conveyor and including a bottom on which the bottles may slide and having an upper section and a lower section, hinge means between said sections and having its axis parallel to said second conveyor, hinge means at the upper end of the upper section and having its axis parallel to said second conveyor, transferring means at the discharge end of said second conveyor periodically engaging the bottles thereon and discharging them into said chute at a predetermined rate, said first conveyor moving at a constant rate of speed such that when a number of bottles sufficient to fill a case have been discharged into the chute the conveyor will have traveled a distance equal to the length of a case plus the distance between cases, actuating means driven in synchronism with said transferring means and engaging said lower section of said bottom and moving the same in the direction of travel of the cases on said first conveyor from a normal position at which the transferring means discharges into the first compartment of a case and at a rate such that said chute bottom is in a position to discharge into each successive compartment upon operation of said transferring means, said actuating means serving to return said bottom to its normal position at the locality of the first compartment of the following case upon discharge by said transferring means into the last compartment of the denoted case.

6. In combination an inclined conveyor carrying bottle cases having bottle receiving compartments arranged in successive order, said conveyor progressing said cases one after the other to cause the compartments to successively pass a certain station, a second substantially horizontal conveyor carrying bottles in upright position, said second conveyor being arranged transversely of said first conveyor and above the same, an inclined chute disposed laterally of said second conveyor and including a bottom on which the bottles may slide, said bottom having an upper section and a lower section, hinge means between said sections and having its axis parallel to said second conveyor, hinge means at the upper end of the upper section and having its axis parallel to said second conveyor, transferring means at the discharge end of said second conveyor periodically engaging the bottles thereon and discharging them into said chute at a predetermined rate, said first conveyor moving at a constant rate of speed such that when a number of bottles sufficient to fill a case have been discharged into the chute the conveyor will have traveled a distance equal to the length of a case plus the distance between cases, actuating means driven in synchronism with said transferring means and engaging said lower section of said bottom and moving the same in the direction of travel of the cases on said first conveyor from a normal position at which the transferring means discharges into the first compartment of a case and at a rate such that said chute bottom is in a position to discharge into each successive compartment upon operation of said transferring means, said actuating means serving to return said bottom to its normal position at the locality of the first compartment of the following case upon discharge by said transferring means into the last compartment of the denoted case and guide means acting between the lower section of the chute bottom and the actuating means therefor and guiding said lower section for movement in substantial parallelism with the end walls of the cases.

7. In combination, an inclined conveyor carrying bottle cases having bottle receiving compartments arranged in successive order, said conveyor progressing said cases one after the other to cause the compartments to successively pass a certain station, a second substantially horizontal conveyor carrying bottles in upright position, said second conveyor being arranged transversely of said first conveyor and above the same, an inclined chute disposed laterally of said second conveyor and including a bottom on which the bottles may slide, said bottom having an upper section and a lower section, hinge means between said sections and having its axis parallel to said second conveyor, hinge means at the upper end of the upper section and having its axis parallel to said second conveyor, transferring means at the discharge end of said second conveyor periodically engaging the bottles thereon and discharging them into said chute at a predetermined rate, said first conveyor moving at a constant rate of speed such that when a number of bottles sufficient to fill a case have been discharged into the chute the conveyor will have traveled a distance equal to the length of a case plus the distance between cases, actuating means driven in synchronism with said transferring means and engaging said lower section of said bottom and moving the same in the direction of travel of the cases on said first conveyor from a normal position at which the transferring means discharges into the first compartment of a case and at a rate such that said chute bottom is in a position to discharge into each successive compartment upon operation of said transferring means, said actuating means serving to return said bottom to its normal position at the locality of the first compartment of the following case upon discharge by said transferring means into the last compartment of the denoted case, an extension of said chute bottom underlying said lower bottom section, guide means acting between said extension and lower bottom section and guiding said extension for movement into and out of the cases and actuating means operated in synchronism with said first conveyor and operating said extension to direct said extension into a case when the leading end wall of the case reaches said station and to retract said extension when the trailing end wall of the case leaves said station.

8. In combination, an inclined conveyor carrying bottle cases having bottle receiving compartments arranged in successive order, said conveyor progressing said cases one after the other to cause the compartments to successively pass a certain station, a second substantially horizontal conveyor carrying bottles in upright position, said second conveyor being arranged transversely of said first conveyor and above the same, an inclined chute disposed laterally of said second conveyor and including a bottom on which the bottles may slide, said bottom having an upper section and a lower section, hinge means between said sections and having its axis parallel to said second conveyor, hinge means at the upper end of the upper section and having its axis parallel to said second conveyor, transferring means at the discharge end of said second conveyor periodically engaging the bottles thereon and discharging them into said chute at a predetermined rate, said first conveyor moving at a constant rate of speed such that when a number of bottles sufficient to fill a case have been discharged into the chute the conveyor will have traveled a distance equal to the length of a case plus the distance between cases, actuating means driven in synchronism with said transferring means and engaging said lower section of said bottom and moving the same in the direction of travel of the cases on said first conveyor from a normal position at which the transferring means discharges into the first compartment of a case and at a rate such that said chute bottom is in a position to discharge into each successive compartment upon operation of said transferring means, said actuating means serving to return said bottom to its normal position at the locality of the first compartment of the following case upon discharge by said transferring means into the last compartment of the denoted case and a parallel motion linkage acting between the lower section of the chute bottom and the actuating means therefor and guiding said lower section for movement in substantial parallelism with the end walls of the cases.

9. In combination, an inclined conveyor carrying bottle cases having bottle receiving compartments arranged in successive order, said conveyor progressing said cases one after the other to cause the compartments to successively pass a certain station, a second substantially horizontal conveyor carrying bottles in upright position, said second conveyor being arranged transversely of said first conveyor and above the same, an inclined chute disposed laterally of said second conveyor and including a bottom on which the bottles may slide, said bottom having an upper section and a lower section, hinge means between said sections and having its axis parallel to said second conveyor, hinge means at the upper end of the upper section and having its axis parallel to said second conveyor, transferring means at the discharge end of said second conveyor periodically engaging the bottles thereon and discharging them into said chute at a predetermined rate, said first conveyor moving at a constant rate of speed such that when a number of bottles sufficient to fill a case have been discharged into the chute the conveyor will have traveled a distance equal to the length of a case plus the distance between cases, a plate attached to said lower bottom section having a slot therein parallel to said lower bottom section, a push rod, a guide therefor, a head on said push rod having means thereon received in said slot and maintaining said lower bottom section parallel to the end walls of said cases throughout the movement of said bottom section, a cam driven in synchronism with said transferring means and a cam follower engaging said cam and operating said push rod, said cam moving the lower bottom section of the chute in the direction of travel of the cases on said first conveyor from a normal position at which the transferring means discharges into the first compartment of a case and at a rate such that said chute bottom is in a position to discharge into each successive compartment upon operation of said transferring means and returning said bottom to its normal position at the locality of the first compartment of the following case upon discharge by said transferring means into the last compartment of the denoted case.

10. In combination, an inclined conveyor carrying bottle cases having bottle receiving compartments arranged in successive order, said conveyor progressing said cases one after the other to cause the compartments to successively pass a certain station, a second substantially horizontal conveyor carrying bottles in upright position, said second conveyor being arranged transversely of said first conveyor and above the same, an inclined chute disposed laterally of said second conveyor and receiving bottles from said second conveyor, said chute having an inclined bottom substantiailly parallel to the end walls of the cases and discharging the bottles into the compartments of the cases, a tilting device including a tilting bar extending along said second conveyor on the same side thereof as said chute in substantially parallel relation thereto at a distance above said conveyor greater than the transverse dimension of the bottles as they travel on said conveyor and a pusher including a pusher bar guided for movement in parallelism with said tilting bar and engaging the bottles at a locality below said tilting bar, said bars operating in conjunction to tilt the bottles and to discharge them into said chute.

11. In combination, an inclined conveyor carrying bottle cases having bottle receiving compartments arranged in successive order, said conveyor progressing said cases one after the other to cause the compartments to successively pass a certain station, a second substantially horizontal conveyor carrying bottles in upright position, said second conveyor being arranged transversely of said first conveyor and above the same, an inclined chute disposed laterally of said second conveyor and receiving bottles from said second conveyor, said chute having an inclined bottom substantially parallel to the end walls of the cases and discharging the bottles into the compartments of the cases, a tilting device including a tilting bar extending along said second conveyor on the same side thereof as said chute in substantially parallel relation thereto at a height above said conveyor greater than the transverse dimension of the bottles as they travel on said conveyor, two spaced shafts, parallel cranks on said shafts, a pusher bar pivoted to said cranks and moving in parallelsim toward and from the bottles on said second conveyor and engaging the bottles at a locality below said tilting bar, said bar serving to tilt the bottles and to discharge them into said chute.

12. In combination, a continuously driven conveyor moving at a constant rate of speed carrying bottle cases having bottle receiving compartments and progressing said cases with the compartments successively passing a given station at uniform speed, a second conveyor carrying bottles and delivering them at said station, bottle guide means at said station receiving the bottles from said second conveyor and discharging them into the compartments of said cases, transferring means disposed at said station and transferring the bottles from said second conveyor to said guide means, means for guiding said bottle guide means for movement along said first conveyor, means for moving said guide means in the direction of movement of said first conveyor while a bottle is being discharged into one of said compartments and moving said guide means in a reverse direction into register with another compartment upon delivery of a bottle into the denoted compartment.

References Cited in the file of this patent

UNITED STATES PATENTS

| | | |
|---|---|---|
| 1,090,855 | Jagenberg | Mar. 24, 1914 |
| 2,318,927 | Davis | May 11, 1943 |
| 2,319,167 | Steward | May 11, 1943 |
| 2,452,376 | Holstebroe et al. | Oct. 26, 1948 |
| 2,650,746 | Rideout et al. | Sept. 1, 1953 |
| 2,684,800 | Lewis | July 27, 1954 |

FOREIGN PATENTS

| | | |
|---|---|---|
| 491,388 | Great Britain | Sept. 1, 1938 |